(12) United States Patent
Tippett

(10) Patent No.: US 7,211,210 B2
(45) Date of Patent: May 1, 2007

(54) DRY FIBRILLATED PTFE FILM AND ITS METHOD OF MANUFACTURE

(75) Inventor: Stephen W. Tippett, New Boston, NH (US)

(73) Assignee: Textiles Coated International, Amherst, NH (US)

( * ) Notice: Subject to any disclaimer, the term of this patent is extended or adjusted under 35 U.S.C. 154(b) by 274 days.

(21) Appl. No.: 10/739,601

(22) Filed: Dec. 18, 2003

(65) Prior Publication Data

US 2004/0170853 A1    Sep. 2, 2004

Related U.S. Application Data

(60) Provisional application No. 60/440,562, filed on Jan. 16, 2003.

(51) Int. Cl.
*B29C 43/22* (2006.01)
*B29C 47/00* (2006.01)

(52) U.S. Cl. .............................. 264/210.2; 264/331.14

(58) Field of Classification Search .................... None
See application file for complete search history.

(56) References Cited

U.S. PATENT DOCUMENTS

| | | | | | |
|---|---|---|---|---|---|
| 4,478,665 | A | * | 10/1984 | Hubis | 156/229 |
| 4,985,296 | A | * | 1/1991 | Mortimer, Jr. | 428/220 |
| 5,234,751 | A | * | 8/1993 | Harada et al. | 442/50 |
| 5,476,589 | A | * | 12/1995 | Bacino | 210/500.36 |
| 5,552,100 | A | * | 9/1996 | Shannon et al. | 264/127 |
| 5,776,343 | A | * | 7/1998 | Cullen et al. | 210/483 |
| 5,843,173 | A | * | 12/1998 | Shannon et al. | 128/898 |
| 6,080,472 | A | * | 6/2000 | Huang et al. | 428/315.5 |
| 6,099,791 | A | * | 8/2000 | Shannon et al. | 264/544 |
| 6,103,172 | A | * | 8/2000 | Newman et al. | 264/288.8 |
| 6,127,486 | A | * | 10/2000 | Burger et al. | 525/199 |
| 2003/0062644 | A1 | | 4/2003 | Oyama et al. | |

* cited by examiner

*Primary Examiner*—Mark Eashoo
(74) *Attorney, Agent, or Firm*—Gauthier & Connors, LLP

(57) ABSTRACT

A finished PTFE film is produced by first preparing an extruded, dried, unsintered and unexpanded PTFE feed film, and then reducing the thickness of the feed film by more than 20% by passing it with back tension through a roll nip.

8 Claims, 2 Drawing Sheets

DRY FIBRILLATED PTFE FILM AND ITS METHOD OF MANUFACTURE

CROSS REFERENCE TO RELATED APPLICATIONS

This application claims priority from provisional application Ser. No. 60/440,562 filed Jan. 16, 2003.

BACKGROUND OF THE INVENTION

1. Field of the Invention

This invention relates to unexpanded, unsintered, and extruded films of polytetrafluoroethylene ("PTFE"), and to the process for producing such films.

2. Description of the Prior Art

Conventionally, unexpanded and unsintered PTFE films are prepared by a process that typically begins by mixing powdered PTFE resin with a solvent to produce a paste. The paste is preformed to remove air, extruded into a film, and then calendered to a desired thickness. The calendered film is then dried to evaporate the solvent.

Films prepared in this manner have specific gravities ranging from about 1.5 to 1.7, thicknesses ranging from about 0.002" to 0.010", and tensile strengths in the machine direction ranging from about 700 to 1800 psi, depending on film thicknesses. Such films conventionally serve many products. One is in the service of components of multi-layered composite products, a prime example being the flexible high strength laminate marketed by Textiles Coated International of Amherst, N.H. under the tradename "LFP," and described in U.S. Pat. No. 5,466,531.

There is now developing a demand for significantly thinner multi-layer products incorporating unexpanded PTFE film components. The majority of the conventionally produced PTFE films have thicknesses that rule them out as candidates for these thinner products. Those films that are thin enough to qualify are either too porous to provide the barrier properties typically required of multi-layer composites, or they are produced by processes that contribute prohibitively to their costs.

SUMMARY OF THE INVENTION

The objective of the present invention is to provide unique significantly thinner unexpanded unsintered PTFE films with beneficially increased specific gravities and higher tensile strengths in the machine direction, making them excellent candidates for inclusion in multilayer products, in particular those produced by lamination at temperatures sufficiently elevated to effect sintering of the PTFE components.

A companion objective of the present invention is the provision of a unique highly efficient and relatively low cost process for producing such thinner films.

In accordance with the present invention, an extruded dried and unsintered PTFE "feed" film is calendered to produce a "finished" film. As compared to the feed film, the finished film has an increased specific gravity, a decreased thickness resulting in decreased weight per unit area, and increased tensile strength in the machine direction, i.e., the direction of film movement through the calender nip.

The specific gravity of the feed film is preferably between 1.5 and 1.7.

Preferably the calender nip is defined by a filled roll and a heated metal roll, with the feed film being subjected to back tension during calendering, and with the thickness of the feed film being reduced by greater than 20% in the calender nip. "Filled rolls" are those conventionally recognized as having resiliently deformable surfaces.

These and other features and advantages of the present invention will now be described in greater detail with reference to the accompanying drawings wherein:

DETAILED DESCRIPTION OF PREFERRED EMBODMENT

Figure 1A:
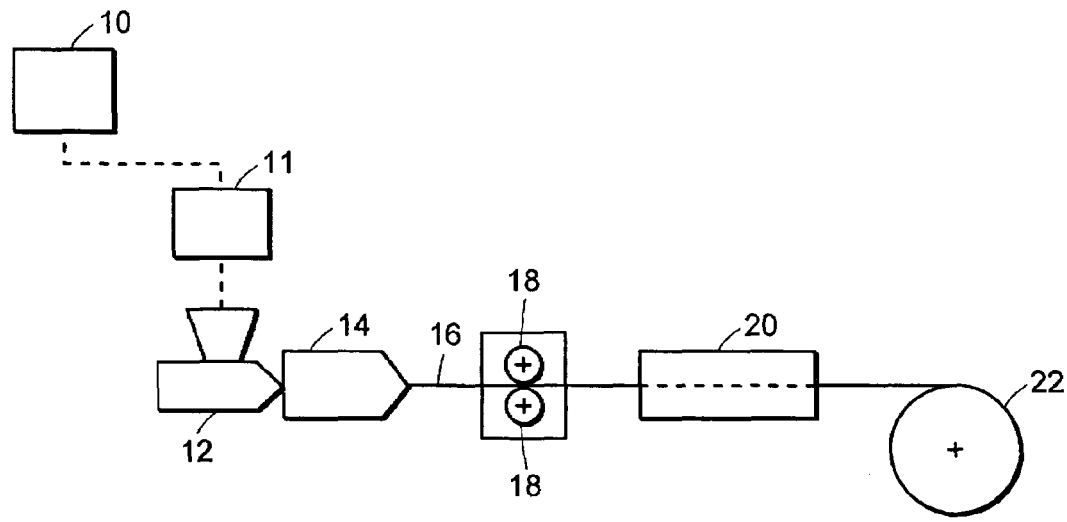
FIG. 1A illustrates a typical process for producing an extruded, dried and unsintered PTFE feed film.

In accordance with the present invention, and as depicted diagrammatically in FIG. 1A, a PTFE resin is combined with an extrusion aid, which is typically a solvent, in a mixer 10 to produce a paste. The resin may comprise DF-230 supplied by Ausimont USA, Thorofare, N.J., and the solvent may comprise Mineral Spirits Odorless supplied by Ashland Specialty Chemical Co., Columbus, Ohio The next step after blending the PTFE resin and the solvent is preforming, which removes the air from the paste. After the paste has been pressed in the preform mold 11, it is delivered to an extruder 12 which extrudes the paste through a film die 14 to produce a solvent laden film 16. The film 16 is calendered to a desired thicknesses between two metal rolls 18, and then is directed through an oven 20 where the solvent is evaporated, with the thus dried unexpanded unsintered feed film being then wound onto a storage reel 22.

Figure 1B:
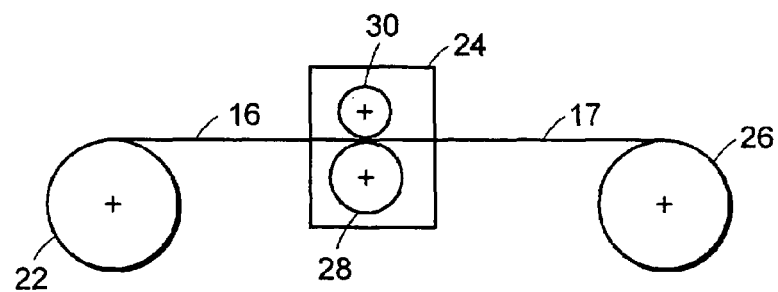
FIG. 1B illustrates a process in accordance with the present invention for calendering the feed film of FIG. 1 into a finished film.

Feed films prepared in this manner are somewhat typical of those produced by conventional processes, with thicknesses ranging from about 0.002" to 0.010", microstructures characterized by voids resulting from solvent evaporation, specific gravities of about 1.6, and tensile strengths in the machine direction of about 700 to 1800 psi. As shown in FIG. 1B, the feed film 16 is then subjected to further processing by being unwound from the storage reel 22 and directed through a calender 24 to produce a finished film 17 which is rewound into a finished roll on reel 26. The calender 24 preferably includes a filled roll 28 and a metal roll 30. The payoff speed of reel 22 is controlled so as to maintain a back tension in the feed film 16 being fed into the nip defined between the calender rolls 28, 30.

The filler material for roll 28 can be selected from the group consisting of wool, paper, cotton, rubber, plastic, etc, and combinations thereof. Roll 30 is preferably carbon steel or stainless steel. Roll 30 is preferably heated to an elevated temperature of about 170° F., although a wide range of temperatures may be used. A wide range of calender pressures may be employed, with preferred pressures ranging from about 600 to 1200 lbs per linear inch ("pli"). Typical calender speeds will be about 10 feet per minute ("fpm), although a wide range of speeds can be considered, depending on the target properties of the finished film.

As the feed film is calendered between rolls 28, 30, a threshold reduction in thickness of approximately 20% collapses the voids produced by the previous solvent evaporation and increases the film's specific gravity to about 2.0.

Further thickness reductions in excess of 20% result in reductions of the film's weight per unit area. The calendered finished film 17 thus becomes heavily oriented in the machine direction, resulting in increased tensile strengths that typically range up to 6000 psi and higher. It is believed that this marked increase in tensile strength is due to the film undergoing dry fibrillation as its thickness is reduced by more than 20% by being calendered in the dry state between the filled and metal rolls 28, 30 of the calender 24. The term "dry fibrillation" refers to the increased formation of fibrils resulting from deformation and resin shearing of the dry film. This is to be contrasted to the conventional calendering of solvent laden films, where resin shearing is accomplished in the presence of lubricating solvent.

In addition to how much the film thickness is reduced beyond the threshold 20%, the extent of dry fibrillation that can take place during a calendering operation is dependent upon a number of other factors including the thickness and strength of the feed film prior to calendering, calendering conditions such as back tension, calender temperature, calender speed and pressure, the filler material for the filled roll, and the number of successive calender nips, i.e., whether a single nip two roll calender is used, as illustrated in the drawings, or alternatively a three roll calender is used to develop two successive nips.

EXAMPLE

A dried unexpanded unsintered feed film having a thicknesses of 0.003", a width of 14", a specific gravity of 1.6, and a tensile strength of 1236 psi in the machine direction, was fed through a single nip calender of the type shown at 24 FIG. 1B. The temperature of the metal roll 30 was maintained at about 170° F., the nip pressure was approximately 881 pli, and the calender rolls were turning at a line speed of about 5 feet per minute ("fpm"). Back tension in the feed film between the payoff reel 22 and the calender nip was maintained at about 2 pli.

The film was compressed to a thickness of 0.0015", with the finished film having a tensile strength of 2664 psi in the machine direction and an increase in specific gravity to 2.0.

Figure 2:
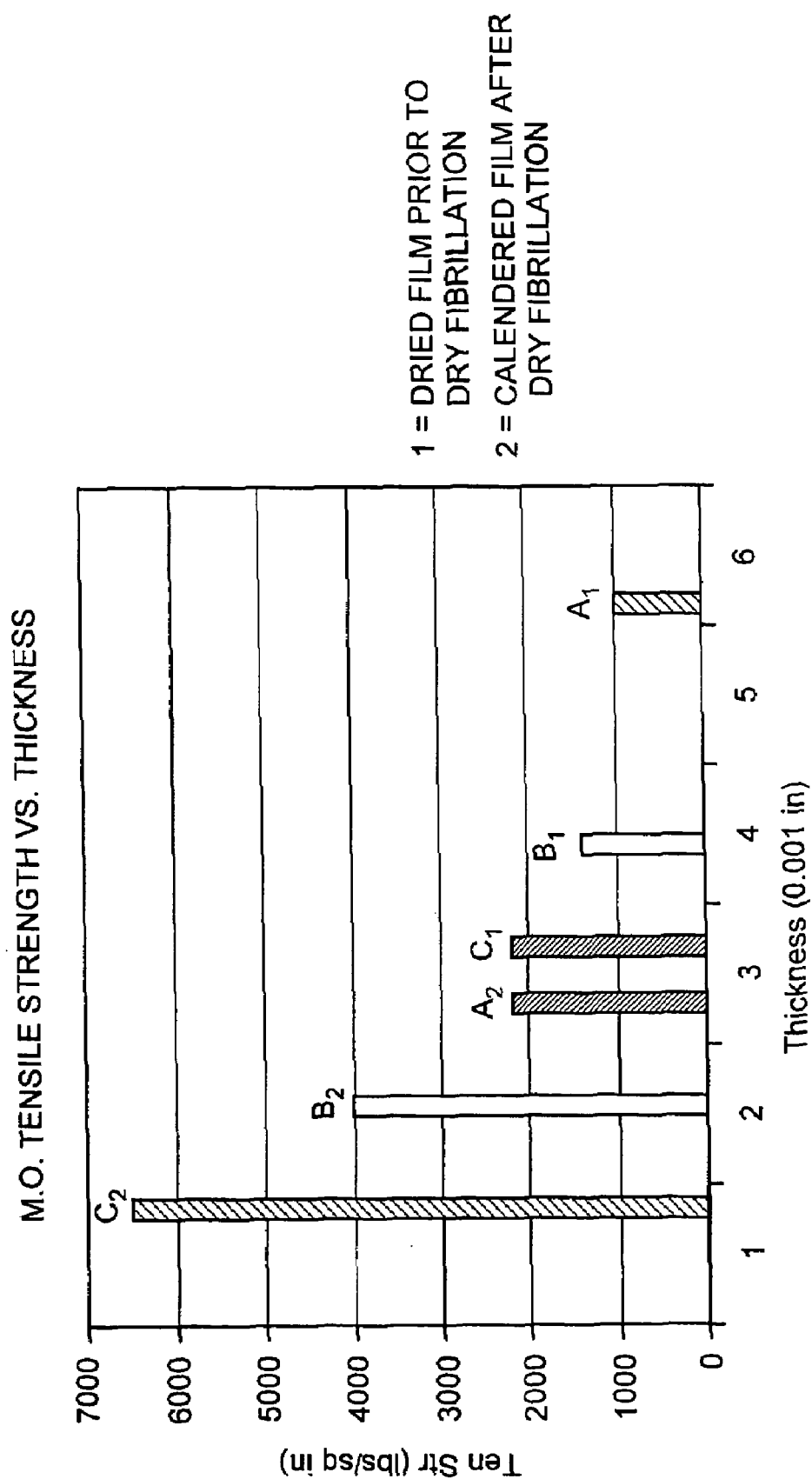
FIG. 2 is a chart comparing the thicknesses and tensile strengths of several PTFE feed films before and after final processing in accordance with the present invention.

FIG. 2 illustrates the reduced thicknesses and accompanying increased tensile strengths resulting from the dry fibrillation of other sample feed films denominated as A, B, and C. The feed and finished films are identified respectively by the subscripts "1" and "2". It will be seen that calendaring in accordance with the present invention can result in the finished films having machine direction ("MD") tensile strengths more than twice those of the respective feed films.

Another observation has been made regarding the manner in which dry fibrillated PTFE films thermally contract in unrestrained pressure conditions after sintering. A most convenient process for producing the previously referenced LFP products involves heating sandwiched standard film components of the type herein described as feed films to sintering temperatures while under pressure, then releasing them from the applied pressure and allowing them to cool unrestrained or only partially restrained in ambient air. As standard, single ply, PTFE films sinter, their specific gravity increases from 1.6 to 2.18. When permitted to cool unrestrained, they develop pronounced ripples/wrinkles. The surface areas of the standard films diminish and it appears that they attempt to retain their original, unsintered, thicknesses, even as their specific gravity increases significantly.

Two experiments related to this subject were conducted involving individual plies of standard and dry fibrillated PTFE films. In both tests, the plies were of equal dimension and weight. The dimensions in one test were 13 3/8"×15 7/8". In the other test, the dimensions were 15 7/8"×19 7/16". The weights of the plies were 3.6 oz/sq yd.

The individual plies were placed between two metal plates that were slightly gapped to permit relatively free thermally induced movement. The assemblies were placed in 730° F. hot ovens for 30 minutes to enable the plies to reach sintering temperatures—around 650° F. After the 30 minutes had elapsed, the assemblies were removed and allowed to cool to ambient temperatures.

The results were surprising. For both the standard and dry fibrillated films, the shrinkage in the cross machine or width direction was around 5%. However, in the machine direction the standard films contracted around 32% while the dry fibrillated films shrunk only 8% to 9%. Additionally, the dry fibrillated films were much flatter than the standard films, which were very wrinkled. The sintered thicknesses of the dry fibrillated films were very close to their beginning thicknesses—actually reducing slightly from 0.0024" to 0.0022". In the standard films, there was also little change in thicknesses, which hovered around 0.003".

It is believed that this discovery is significant because it may lead to flatter, less wrinkled LFP laminates. A dry fibrillated film, prior to sintering, has a specific gravity of around 2.0. Thus consolidation to 2.15 during sintering is not a significant change and requires little movement of the polymer. A standard PTFE film, on the other hand, goes from 1.6 to 2.18 during consolidation, a comparatively major change in movement.

It is understood that materials tend to minimize their surface areas at their melting point. Thus, the standard PTFE film, with its 0.003" thickness, will try to maintain its original thickness, even as the product dramatically increases in density. Accordingly, this can only be accomplished by generating a reduction in its length and/or width dimensions. The dry fibrillated film, on the other hand, experiences only a relatively small change in density. Little movement is required of the polymer at its melting point and, as such, it has little chance to influence a reduction in its surface area, retaining its relatively flat profile.

In light of the forgoing, those skilled in the art will appreciate that the present invention represents a significant advance in the processing of PTFE films. By further calendering conventionally produced dry unsintered PTFE feed films in accordance with the above-described procedures, unique properties are imparted to the resulting finished film. These include the elimination of voids created by the prior solvent evaporation, and increased tensile strengths in the machine direction resulting from what is believed to be increased fibrillation as the film's thickness is reduced by more than an initial threshold reduction of 20% to thereby decrease the film's weight per unit area. All of this is achieved by a simple relatively straightforward process that can be readily adapted to the production of a wide range of products.

While calender nips defined by filled and metal rolls are preferred, it will be understood that dry calendering in accordance with the present invention can also be performed between metal rolls. Also, dry calendering may take place in either a single nip, or in two or more successive nips. Stretching of the feed film 17 may also take place after the drying step depicted at 20 in FIG. 1A.

I claim:

1. A method of producing a finished PTFE film, comprising:
   a) mixing powdered PTFE resin with a solvent to produce a paste;

b) preforming the paste to remove any entrapped air;
c) extruding the paste into a solvent laden wet film;
d) calendering the wet film to a desired thickness;
e) evaporating the solvent from the thus calendered wet film to produce a dry unsintered and unexpanded feed film; and
f) passing said feed film with back tension through a roll nip in an additional calendering step in which the thickness of said feed film is reduced to an extent sufficient to increase the machine direction tensile strength of the resulting finished PTFE film to more than twice the machine direction tensile strength of said feed film.

2. A method of producing a finished PTFE film, comprising:
a) mixing powdered PTFE resin with a solvent to produce a paste;
b) preforming the paste to remove any entrapped air;
c) extruding the paste into a solvent laden wet film;
d) calendering the wet film to a desired thickness;
e) evaporating the solvent from the thus calendered wet film to produce a dry unsintered and unexpanded feed film having a specific gravity of about 1.5 to 1.7; and
f) passing said feed film with back tension through a roll nip in an additional calendering step in which the thickness of said feed film is reduced by more than 20%, and the specific gravity of the resulting finished PTFE film is increased to about 2.0.

3. The method of claim 1 wherein said roll nip is defined by a metal roll and a filled roll.

4. The method of claim 3 wherein said metal roll is heated to a temperature of about 170° F.

5. The method of claim 1 wherein said feed film is subjected to a pressure of between about 600 to 1200 pli.

6. The method of claim 1 wherein said back tension is maintained at about 2 pli.

7. The method of claim 1 wherein the tensile strength of said finished PTFE film is increased to more than twice that of said feed film.

8. The method of claim 1 wherein the microstructure of said feed film is characterized by voids resulting from evaporation of said solvent, and wherein said voids are collapsed as a result of passing said feed film through said roll nip.

* * * * *